US008159517B2

(12) United States Patent
Lim et al.

(10) Patent No.: US 8,159,517 B2
(45) Date of Patent: Apr. 17, 2012

(54) METHOD AND DEVICE FOR SETTING OUTPUT VOLUME OF AUDIO SIGNAL TO PREVENT ACOUSTIC SHOCK IN MOBILE TERMINAL

(75) Inventors: Dok-Shin Lim, Seoul (KR); Kyoung-Ae Lim, Seoul (KR); Won-Joo Park, Anyang-si (KR); Young-Sun Shin, Seoul (KR); Min-Sun Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 1655 days.

(21) Appl. No.: 11/482,218

(22) Filed: Jul. 7, 2006

(65) Prior Publication Data

US 2007/0024700 A1 Feb. 1, 2007

(30) Foreign Application Priority Data

Jul. 27, 2005 (KR) .................. 10-2005-0068370

(51) Int. Cl.
*H04N 7/14* (2006.01)
(52) U.S. Cl. .................. 348/14.01; 348/E7.078
(58) Field of Classification Search .............. 455/567, 455/345, 569, 570, 67, 351, 451; 379/373, 379/433, 392, 388, 488; 381/104, 107; 348/14.01, 348/E7.078
See application file for complete search history.

(56) References Cited

U.S. PATENT DOCUMENTS

| | | | | |
|---|---|---|---|---|
| 5,749,056 A * | 5/1998 | Patterson et al. .......... 455/569.1 |
| 5,758,079 A * | 5/1998 | Ludwig et al. ................ 709/204 |
| 6,035,211 A * | 3/2000 | Rabe et al. .................... 455/567 |
| 6,104,808 A * | 8/2000 | Alameh et al. ........... 379/433.02 |
| 2002/0080186 A1 * | 6/2002 | Frederiksen ................... 345/808 |
| 2003/0112947 A1 * | 6/2003 | Cohen ....................... 379/202.01 |
| 2003/0133551 A1 * | 7/2003 | Kahn ......................... 379/102.03 |
| 2004/0119814 A1 * | 6/2004 | Clisham et al. ............. 348/14.08 |
| 2004/0203996 A1 * | 10/2004 | Hansson ..................... 455/550.1 |
| 2004/0204194 A1 * | 10/2004 | Akai et al. .................. 455/575.1 |
| 2004/0242160 A1 * | 12/2004 | Ichikawa et al. ........... 455/67.13 |
| 2005/0043009 A1 * | 2/2005 | Shirai et al. ................ 455/404.1 |
| 2005/0073575 A1 * | 4/2005 | Thacher et al. ............. 348/14.13 |
| 2005/0220281 A1 * | 10/2005 | Ito ............................. 379/100.01 |
| 2005/0226428 A1 * | 10/2005 | McIntosh et al. ............... 381/55 |
| 2005/0227674 A1 * | 10/2005 | Kopra et al. ................ 455/414.1 |
| 2005/0286713 A1 * | 12/2005 | Gunn et al. ............... 379/406.04 |
| 2006/0019706 A1 * | 1/2006 | Ho et al. .................... 455/556.2 |
| 2006/0089180 A1 * | 4/2006 | Salmi ......................... 455/575.1 |
| 2006/0190831 A1 * | 8/2006 | Kelso et al. ................... 715/764 |
| 2007/0186002 A1 * | 8/2007 | Campbell et al. ............. 709/231 |
| 2009/0064233 A1 * | 3/2009 | Kondo et al. ................... 725/58 |

* cited by examiner

*Primary Examiner* — Nick Corsaro
*Assistant Examiner* — Mahendra Patel
(74) *Attorney, Agent, or Firm* — The Farrell Law Firm, P.C.

(57) ABSTRACT

A mobile terminal with a function for setting an output volume of an audio signal to prevent acoustic shock is disclosed. In the mobile terminal, a receiver is integrated into a speaker. The speaker limits the initial output volume of an audio signal to a predetermined level. The mobile terminal provides a menu for setting an output volume of an audio signal. The menu enables a user to select either to maintain the currently limited volume level or to change to a volume level set for a speaker mode. Since an audio signal received with the connection of an incoming call is output at a predetermined reference volume level, acoustic shock caused by unexpectedly high-level of sound volume can be prevented.

14 Claims, 4 Drawing Sheets

METHOD AND DEVICE FOR SETTING OUTPUT VOLUME OF AUDIO SIGNAL TO PREVENT ACOUSTIC SHOCK IN MOBILE TERMINAL

PRIORITY

This application claims priority to an application entitled "Method and Device for Setting Output Volume of Audio Signal to Prevent Acoustic Shock in Mobile Terminal" filed with the Korean Intellectual Property Office on Jul. 27, 2005 and assigned Serial No. 2005-68370, the contents of which are incorporated herein by reference.

BACKGROUND OF THE INVENTION

1. Field of the Invention

The present invention relates to a mobile terminal having a video call function, and more particularly to a method and device for setting an output volume of an audio signal to prevent acoustic shock in a mobile terminal.

2. Description of the Related Art

Generally, mobile terminals capable of sending or receiving images can offer video call services which send a user's image and display an image received from another user on a display screen. During a video call, the display screen is divided into a main screen and a sub screen to display two video images (one received and the other sent) simultaneously. Call participants can talk to each other, viewing the video images on the divided screen and hearing the voice outputted through the speaker.

Mobile terminals generally have a plurality of means for outputting sound sources, for example, a speaker for outputting sound sources such as a bell sound, MP3 music and an audio signal received during a video call, a receiver or a hands-free connector for outputting voice during a call, and an earphone connector for outputting voice or other sound sources during a call. Mobile terminals offering video call services have multiple sound data transmission paths corresponding to the respective sound source output means. Each of the sound data transmission paths may include a volume adjuster for setting an output volume of an audio signal. Mobile terminals output sound source data through a currently set transmission path at a volume level set by a volume adjuster of the current transmission path.

The sound data transmission path can be set according to the condition of connection between a mobile terminal and an external device or according to the kind of the sound source to be outputted. For example, when an earphone is connected to a mobile terminal through an earphone connector, a sound data transmission path corresponding to the earphone connector is set to output sound source data. When the mobile terminal offers video call services without being connected to any external device, a sound data transmission path corresponding to the speaker of the terminal is set to output sound source data received during the video call. In addition, a sound data transmission path corresponding to the receiver is set to output voice during a call. The volume level can be set through a key input according to the user's command.

Mobile terminals are becoming smaller, sleeker and lighter to meet the demands for improved design, portability and cost reduction. To comply with this trend, mobile terminals have been developed to allocate a speaker and a receiver to a single sound data transmission path and output sound source data through the single transmission path.

Conventional mobile terminals with separate a speaker and receiver output voice during a video call and voice during a general voice call through different transmission paths corresponding respectively to the speaker and the receiver at volume levels set by the volume adjusters of the respective transmission paths. However, mobile terminals with an integrated speaker and receiver output both of the above sound source data through a single sound data transmission path. Specifically, the integrated mobile terminals output voice during a video call in a default speaker mode and voice during a general call in a default receiver mode or normal mode.

Although the volume level can be set according to a sound output means or according to a call type such as a video call or a general voice call, the following problems may arise.

When a video call is initiated by an incoming call, an integrated mobile terminal sets a transmission path for outputting video call signals. A user can hear and talk to a partner through the speaker, while maintaining a distance from the mobile terminal to see the partner's image displayed on the display screen, with the volume being louder to accommodate the distance. However, the user may hold the mobile terminal close to ear to receive an incoming call, without knowing whether it is a video call or a general voice call. At this time, the user may be startled by the intense sound abruptly outputted at a high volume level which is set for a video call in the speaker mode.

Also, while making a voice call with the mobile terminal held close to the ear, the user may cause a sudden change to the speaker mode by an inadvertent pressing of a speaker mode key or the like. Then the user may experience a sudden acoustic shock due to the unexpectedly high-level of sound volume outputted through the speaker before moving the terminal away from the ear.

SUMMARY OF THE INVENTION

As explained above, a conventional mobile terminal with an integrated speaker and receiver may cause acoustic shock to a user who holds the terminal close to the ear to receive an incoming call for initiating a video call. Also, acoustic shock may occur when there is a sudden change of mode to the speaker mode during a voice call.

Accordingly, the present invention has been made to solve the above-mentioned problems occurring in the prior art, and an object of the present invention is to provide a method and device for setting an output volume of an audio signal in a mobile terminal so that initial sound can be outputted at a stable volume level to prevent acoustic shock.

In accordance with one aspect of the present invention for accomplishing the above object, there is provided a method for setting an output volume of an audio signal in a mobile terminal to prevent acoustic shock, which includes detecting an incoming call for making a video call; outputting an audio signal received in relation to the video call in a safe speaker mode limiting a volume level when the call is connected; and changing the current safe speaker mode to an original speaker mode when a user inputs a request for adjusting an output volume of the audio signal.

In accordance with another aspect of the present invention, there is provided a method for setting an output volume of an audio signal in a mobile terminal to prevent acoustic shock, which includes detecting an incoming call for making a voice call; outputting an audio signal received in relation to the voice call in a receiver mode at a volume level not higher than a predetermined level when the call is connected; and changing the current receiver mode to a speaker mode when a user inputs a request for adjusting an output volume of the audio signal.

In accordance with still another aspect of the present invention, there is provided a mobile terminal capable of setting an output volume of an audio signal to prevent acoustic shock, which includes an RF unit for detecting an incoming call; a control unit for connecting a call when a user inputs a request for call connection corresponding to the incoming call, for outputting an audio signal received with the call connection at a reference volume level preset to limit an output volume, and for canceling the limiting of the volume level when the user inputs a request for adjusting an output volume of the audio signal; and a voiceband signal processor for outputting the audio signal at the reference volume level when the call is connected under the control of the control unit, and for outputting the audio signal at an original volume level when the limiting of the volume level is cancelled.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

A mobile terminal according to the present invention has a function for setting an output volume of an audio signal to prevent acoustic shock. In the mobile terminal, a receiver is integrated into a speaker. The speaker limits the initial output volume of an audio signal to a predetermined level. According to the present invention, the mobile terminal provides a menu for setting an output volume of an audio signal. The menu enables a user to select either to maintain the currently limited volume level or to change to a volume level set for a speaker mode. Since an audio signal received with the connection of an incoming call is outputted at a predetermined reference volume level, acoustic shock caused by unexpectedly high-level of sound can be prevented.

Figure 1:
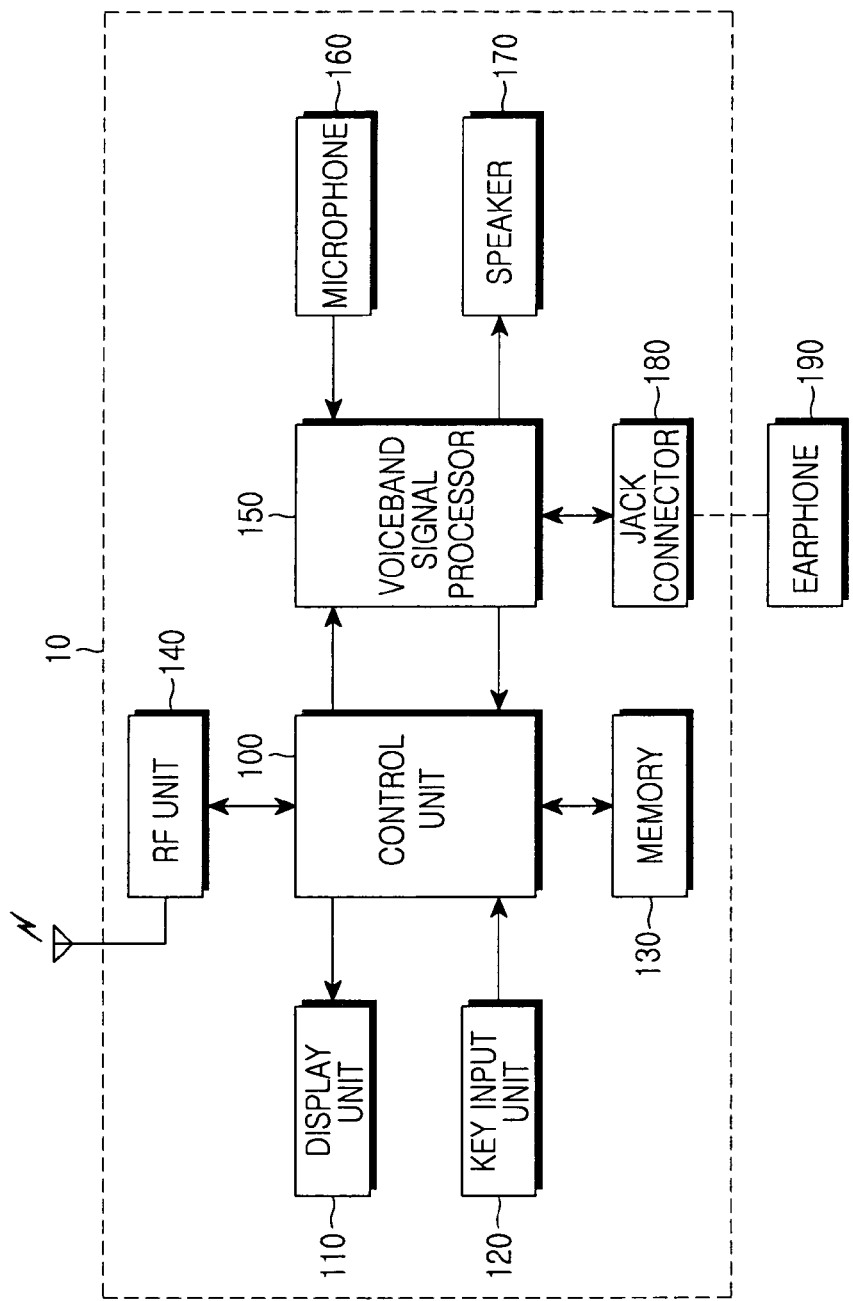
FIG. 1 is a block diagram showing the structure of a mobile terminal according to the present invention.

The essential elements and operations of the mobile terminal having the above function will be explained in detail with reference to the block diagram of FIG. 1. Referring to FIG. 1, the mobile terminal 10 capable of preventing acoustic shock includes a control unit 100, a display unit 110, a key input unit 120, a memory 130, an RF unit 140, a voiceband signal processor 150, a microphone 160, a speaker 170 and a jack connector 180.

The control unit 100 controls overall operations of the mobile terminal for performing wireless communication and data processing. According to the present invention, the control unit 100 initially outputs an audio signal at a reference volume level to prevent acoustic shock, and adjusts the output volume of the audio signal according to the user's command. The audio signal includes voice during a video call or a general voice call and any other sounds such as an alarm.

The following explains how to control the output of an audio signal received during a video call. When an incoming call determined by the RF unit 140 is a video call, the control unit 100 informs the user of the incoming call. When the user presses a key to connect the call, the control unit 100 outputs an audio signal received with the video call connection through the speaker 170. Since the default output mode for a video call is a speaker mode, the received audio signal is initially outputted through the speaker 170. Even in the speaker mode, the output volume of the audio signal is limited so as to not exceed a reference volume level to prevent acoustic shock. To be specific, the received audio signal is outputted in a safe speaker mode that limits the output volume to not exceed a reference output level of 120 dBspl which is a sound pressure level corresponding to voice outputted during a general voice call. The reference output level can be set to 120 dBspl or any other value within a safe range proposed by the European Telecommunications Standards Institute (ETSI).

When the user selects a menu for adjusting the output volume of the audio signal, the control unit 100 displays items for setting the output volume of the audio signal so that the user can select either to maintain the current safe speaker mode or to change to an original speaker mode. The items can be displayed in a popup window which is automatically generated after a predetermined period of time or which is generated when a menu for changing the current mode to the speaker mode is selected by the user.

When the user selects the safe speaker mode, the control unit 100 maintains the current output volume to output the audio signal. On the other hand, when the user selects the original speaker mode, the control unit 100 adjusts the output volume of the audio signal to a higher level set for the original speaker mode.

The following describes how to control the output of an audio signal received during a general voice call.

When an incoming call determined by the RF unit 140 is a voice call, the control unit 100 informs the user of the incoming call. When the user presses a key to connect the call, the control unit 100 outputs an audio signal received with the voice call connection through the speaker 170. Since the default output mode for a voice call is a receiver mode, the received audio signal is outputted through the speaker 170 integrated with a receiver. Even in the receiver mode, the output volume of the audio signal is limited so as to not exceed a reference volume level of 120 dBspl to prevent acoustic shock.

While outputting the audio signal at the limited volume level, the control unit 100 detects whether the user inputs a request for adjusting the output volume of the audio signal. The user can change the current safe receiver mode to the speaker mode by selecting a specific menu or a speaker mode key in order to hear in the speaker mode at a higher volume level corresponding to voice outputted during a video call.

Specifically, when the user selects a menu for adjusting the output volume of the audio signal, the control unit 100 displays items for setting the output volume of the audio signal so that the user can select either to maintain the current safe receiver mode or to change to the speaker mode. When the user selects the safe receiver mode, the control unit 100 maintains the current output volume to output the audio signal. On the other hand, when the user selects the speaker mode, the control unit 100 adjusts the output volume of the audio signal to a higher reference level set for the speaker mode.

As explained above, the control unit 100 outputs an audio signal at a volume level corresponding to the speaker mode or the receiver mode, each mode limiting the output volume to not exceed a predetermined volume level. In other words, the control unit 100 outputs an audio signal at a reference volume level preset to limit the output volume. When the user inputs a request for adjusting the output volume of the audio signal, the control unit 100 then cancels the limiting of the volume level and outputs the audio signal at a level adjusted according to the user's selection. The control unit 100 can also limit the output volume of other sounds such as an alarm sound or a new message alert sound. To be specific, while outputting an audio signal in relation to a voice call in the receiver mode, the control unit 100 determines whether any preset alarm time is reached. When the preset alarm time is reached, the control unit 100 generates an alarm sound at a volume not exceeding a predetermined level. Similarly, the control unit 100 detects the arrival of a new message while outputting an audio signal received in relation to a voice call. At this time, the control unit 100 may output a new message alert sound at a volume not exceeding a predetermined level.

The display unit 110 displays data corresponding to a key input through the key input unit 120. The display unit 110 also displays the operational state of the mobile terminal when the user sets or implements any function. According to the present invention, the display unit 110 displays video images and the current output level of an audio signal during a video call under the control of the control unit 100. In addition, the display unit 110 generates a popup window for allowing the user to adjust the output volume of an audio signal.

The key input unit 120, having a plurality of alphanumeric keys and function keys, transfers data corresponding to the user's key input to the control unit 100. According to the present invention, the key input unit 120 may further include a mode change key for enabling the user to adjust the output volume of an audio signal.

The memory 130 connected to the control unit 100 consists of a ROM (Read Only Memory), a RAM (Random Access Memory) and a voice memory for storing a plurality of programs and information necessary to control operations of the mobile terminal. The memory 130 stores information related to the overall functions of the mobile terminal 10 and a reference volume level for the safe speaker mode and the safe receiver mode.

The voiceband signal processor 150 connected to the control unit 100 is also connected to a plurality of sound source output means and the microphone 160. The voiceband signal processor 150 receives an audio signal input through the microphone 160 and outputs the signal to the control unit 100. When a call is connected under the control of the control unit 100, the voiceband signal processor 150 outputs a received audio signal at a reference volume level. When the limitation of the volume level is cancelled, the voiceband signal processor 150 then outputs the audio signal at an original volume level.

One of the multiple sound source output means is the speaker 170. An earphone 190 or a hands-free car kit connected to the mobile terminal through the jack connector 180 can also be the sound source output means. The voiceband signal processor 150 sets a sound data transmission path under the control of the control unit 100, converts an audio signal input from the control unit 100 into audible sound and outputs the sound through the speaker 170 integrated with a receiver. In other words, the speaker 170 and the receiver are integrated to form one element having a single transmission path. When a call is connected, the transmission path to the speaker 170 is set to output an audio signal, regardless of whether the connected call is a video call or a voice call. The transmission path to the speaker 170 is set only when no external device is connected to the mobile terminal.

According to the present invention, when a video call initiated by an incoming call is connected, the mobile terminal determines an output volume based on a preset reference volume level (for example, 120 dBspl) and activates the safe speaker mode to output an audio signal received in relation to the video call at the determined output volume level. Alternatively, when a voice call initiated by an incoming call is connected, the mobile terminal determines an output volume based the same reference volume level and activates the safe receiver mode to output an audio signal received in relation to the voice call at the determined volume level. Since the output volume of the audio signal does not exceed the reference volume level in both the safe speaker mode and the safe receiver mode, acoustic shock due to unexpectedly high-level of sound volume can be prevented. The reference volume level is preset to a level that does not make the user uncomfortable when hearing output sound.

During the safe speaker mode or the safe receiver mode, the user may input a request for adjusting the output volume of the audio signal. According to the user's selection, the audio signal can be output at the current volume level in the current mode or at a higher volume level in the original speaker mode.

Figure 2:
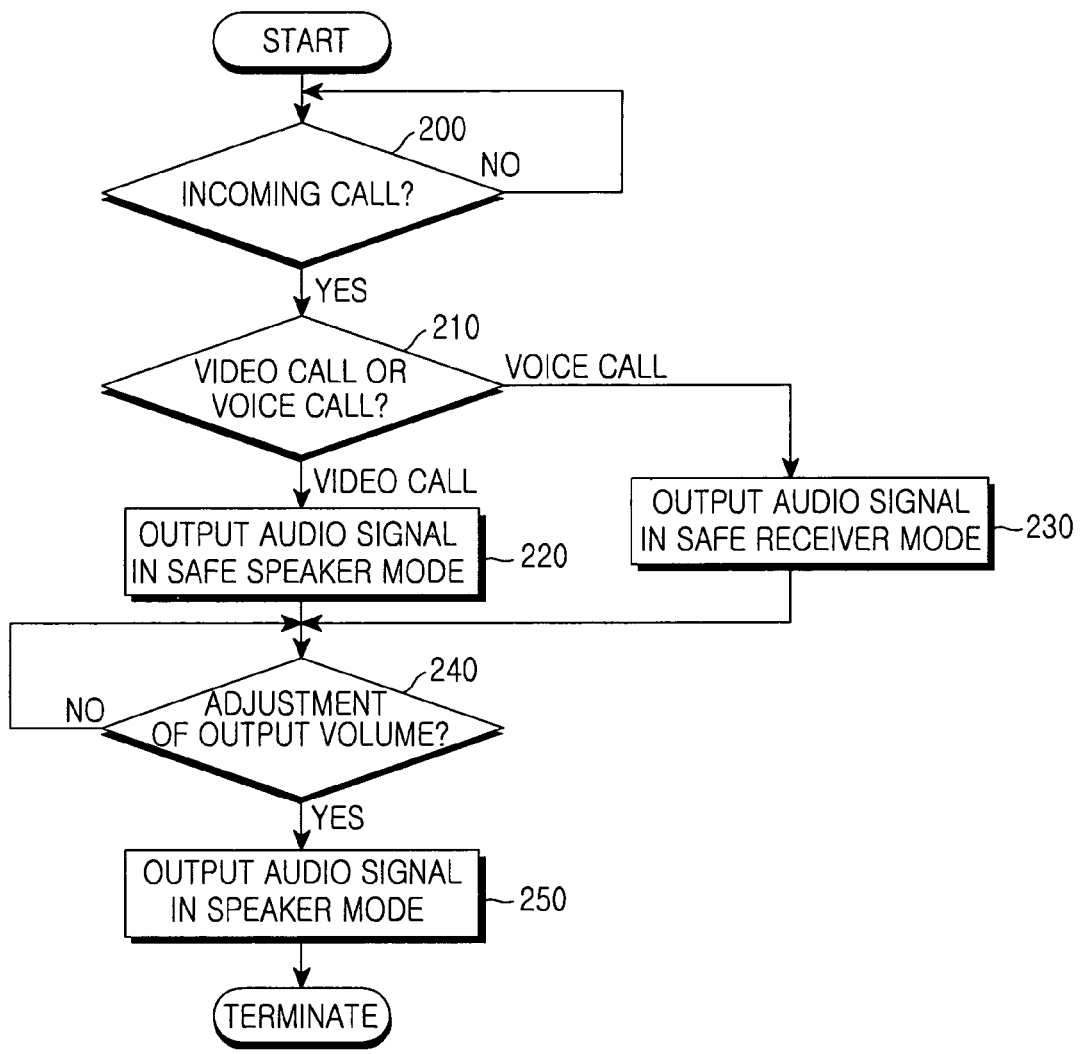
FIG. 2 is a flow chart showing a process for controlling an output of an audio signal received with an incoming call according to the present invention.
Figure 3:
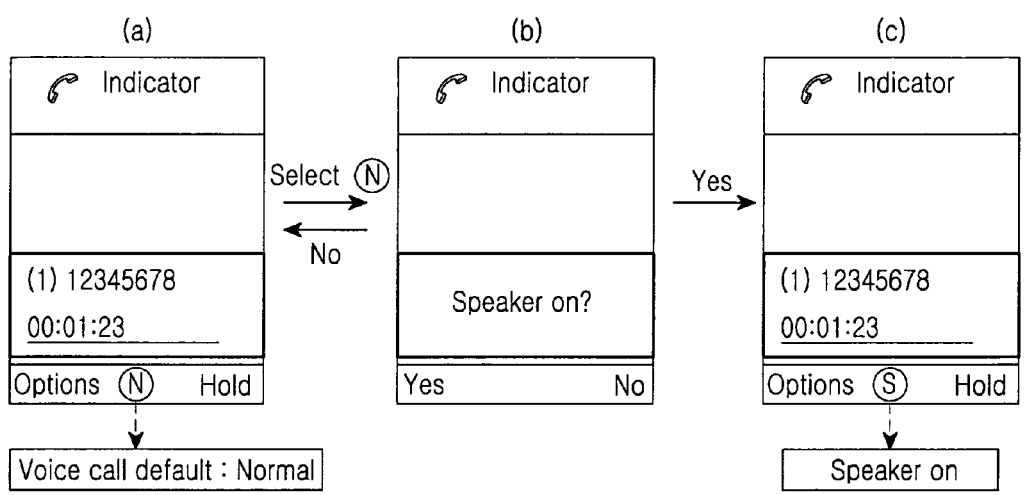
FIG. 3 illustrates screens for setting an output volume of an audio signal received in relation to a voice call according to a first embodiment of the present invention.
Figure 4:
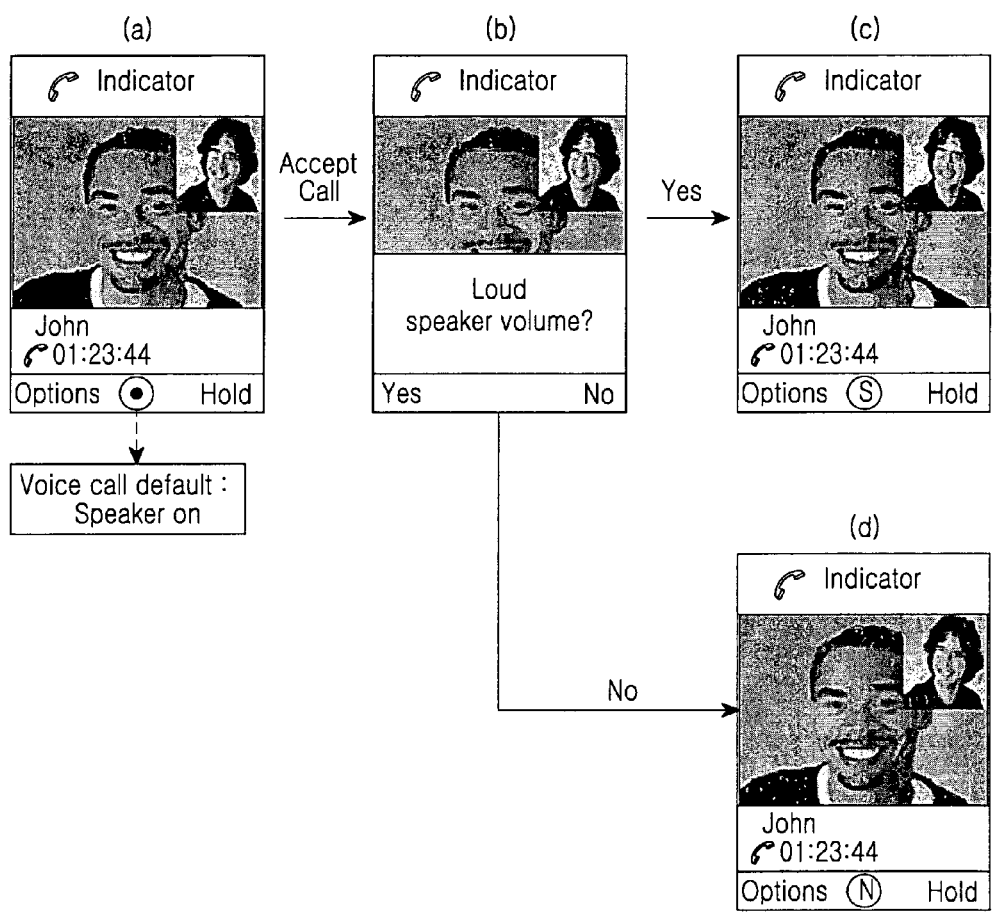
FIG. 4 illustrates screens for setting an output volume of an audio signal received in relation to a video call according to a second embodiment of the present invention.

Hereinafter, example applications of the present invention will be explained in detail with reference to FIGS. 2 to 4. FIG. 2 is a flow chart showing a process for controlling an output of an audio signal received with an incoming call, FIG. 3 illustrates screens for setting an output volume of an audio signal received in relation to a voice call, and FIG. 4 illustrates screens for setting an output volume of an audio signal received in relation to a video call according to the present invention. FIGS. 3 and 4 show how to set an output volume of an audio signal according to the call type such as a video call or a voice call.

Referring to FIG. 2, when an incoming call is detected at step 200, the control unit 100 proceeds to step 210 to determine whether the incoming call initiates a video call or a voice call. When a video call initiated by the incoming call is connected, the control unit 100 displays a screen showing the call connection as illustrated in FIG. 4(*a*) and proceeds to step 220 to output an audio signal in the safe speaker mode. At this time, the control unit 100 outputs the audio signal at a reference volume level corresponding to voice output during a general voice call.

When a voice call initiated by the incoming call is connected, the control unit 100 displays a screen showing the call connection as illustrated in FIG. 3(*a*) and proceeds to step 230 to output an audio signal in the safe receiver mode. At this time, the control unit 100 outputs the audio signal at the reference volume level corresponding to voice output during a general voice call. During the voice call, an icon "N" is displayed in the screen of FIG. 3(*a*) to indicate the current safe receiver mode (i.e., normal mode) that limits the output volume to a level not exceeding the reference volume level.

In summary, when a video call or a voice call is connected, the control unit 100 sets the output volume of an audio signal to the preset reference volume level and outputs the audio signal at the reference volume level.

According to the present invention, the control unit 100 generates a popup window after a predetermined period of time from the output of an audio signal received in relation to a video call and displays a message in the popup window asking whether to change the current safe speaker mode to the original speaker mode. Also, during the safe receiver mode that outputs an audio signal received in relation to a voice call, the control unit 100 automatically generates a popup window and displays a message asking whether to change the current safe receiver mode to the speaker mode, even if the user does not input a request for adjusting the output volume of the audio signal. To be specific, the message in FIG. 3(*b*) can be displayed during a voice call to ask whether the user wishes to change the current mode to the speaker mode. Also, the message in FIG. 4(*b*) can be displayed during a video call to ask whether the user wishes to change the current mode to the original speaker mode (loud speaker mode).

While displaying the above message in the popup window, the control unit 100 detects whether the user selects adjustment of the output volume at step 240. When the user selects maintaining the current mode, the control unit 100 maintains the current mode and outputs the audio signal at the current reference volume level. Otherwise, when the user selects adjustment of the output volume, i.e. change to the speaker mode, the control unit 100 proceeds to step 250 to change the current mode to the speaker mode and outputs the audio signal at a higher volume level. For user's convenience, the control unit 100 may display an icon "S" indicating the speaker-on state as illustrated in FIG. 3(*c*) when the user selects the adjustment of the output volume during a voice call. When the user selects maintenance of the current mode during a video call, the control unit 100 may display an icon "N" indicating the normal mode (i.e. the current safe speaker mode) as illustrated in FIG. 4(*d*). When the user selects adjustment of the output volume during a video call, the control unit 100 may display an icon "S" indicating the speaker mode as illustrated in FIG. 4(*c*).

Although only the volume levels set for the receiver mode and the speaker mode have been explained, it is possible to generate a popup window to allow the user to increase an output volume of an audio signal gradually. In addition, although the method for setting an output volume of an audio signal has been explained in relation to a video call or a voice call, it is also applicable to an incoming call sound, alarm sound and message tone.

As explained above, the mobile terminal according to the present invention initially outputs an audio signal at a preset reference volume level so that initial sound can be outputted at a stable volume level to prevent acoustic shock.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for setting an output volume of an audio signal in a mobile terminal to prevent acoustic shock, the method comprising:
    detecting an incoming call as being a video call during which an image received from another mobile terminal is displayed on a display screen of the mobile terminal;
    outputting an audio signal received in relation to the video call in a safe speaker mode limiting a volume level when the video call is connected; and
    automatically displaying a message asking whether to adjust the output volume of the audio signal while receiving the video call without pressing any key after a predetermined period of time from the output of the audio signal;
    changing the safe speaker mode to an original speaker mode during the video call when a user inputs a request for adjusting the output volume of the audio signal,
    wherein the mobile terminal has an integrated speaker and receiver with a single transmission path through which sound is emitted automatically.

2. The method as claimed in claim 1, wherein the safe speaker mode limits the output volume to a volume level corresponding to voice output during a voice call.

3. The method as claimed in claim 1, wherein the safe speaker mode limits the output volume to a volume level not exceeding 120 dBspl.

4. The method as claimed in claim 1, wherein the output volume of the audio signal is increased to a volume level corresponding to the original speaker mode with a change of a current mode to the original speaker mode.

5. A method for setting an output volume of an audio signal in a mobile terminal to prevent acoustic shock, the method comprising:
    determining whether an incoming call is a video call during which an image received from another mobile terminal is displayed on a display screen of the mobile terminal;
    outputting an audio signal received in relation to the call in a receiver mode at a volume level not higher than a predetermined level when the call is connected; and
    automatically displaying a message asking whether to adjust the output volume of the audio signal while receiving the call without pressing any key after a predetermined period of time from the output of the audio signal;
    changing the receiver mode to a speaker mode during the call when a user inputs a request for adjusting the output volume of the audio signal,
    wherein the mobile terminal has an integrated speaker and receiver with a single transmission path through which sound is emitted.

6. The method as claimed in claim 5, wherein the message is displayed in a popup window.

7. The method as claimed in claim 5, further comprising
    determining whether any preset alarm time is reached, while outputting the audio signal in the receiver mode; and
    generating an alarm sound at a volume not exceeding the predetermined level when the preset alarm time is reached.

8. The method as claimed in claim 5, further comprising:
    determining whether a new message has arrived during the output of the audio signal; and
    outputting a new message alert sound at a volume not exceeding the predetermined level.

9. The method as claimed in claim 5, wherein the receiver mode limits the output volume to a volume level not exceeding 120 dBspl.

10. A mobile terminal capable of setting an output volume of an audio signal to prevent acoustic shock, the mobile terminal comprising:
    an RF unit for detecting an incoming call;
    a control unit configured to detect the incoming call as being a video call during which an image received from another mobile terminal is displayed on a display screen of the mobile terminal, configured to connect a call when a user inputs a request for call connection corresponding to the incoming call, configured to output an audio signal received with the call connection at a reference volume level during the call preset to limit the output volume, and configured to cancel the limiting of the volume level when the user inputs a request for adjusting the output volume of the audio signal; and a voiceband signal processor for outputting the audio signal at the reference volume level when the call is connected under the control of the control unit, and for outputting the audio signal at an original volume level when the limiting of the volume level is cancelled, wherein the mobile terminal has an integrated speaker and receiver with a single transmission path, wherein the control unit is further configured to automatically display a message asking whether to adjust the output volume of the audio signal while receiving the call without pressing any key after a predetermined period of time from the output of the audio signal.

11. The mobile terminal as claimed in claim 10, further comprising a display unit for displaying a message asking whether to adjust the output volume of the audio signal when the user inputs the request for adjusting the output volume of the audio signal.

12. The mobile terminal as claimed in claim 10, wherein said reference volume level does not exceed 120 dBspl.

13. The mobile terminal as claimed in claim 10, wherein said original volume level is a volume corresponding to a speaker mode.

14. The mobile terminal as claimed in claim 1, wherein the integrated speaker and receiver outputs the audio signal received in relation to the video call during the video call and outputs another audio signal received in relation to a voice call during the voice call.

* * * * *